F. L. STUART.
RECLAIMING AND CONVEYING APPARATUS.
APPLICATION FILED DEC. 18, 1918.
1,313,352.
Patented Aug. 19, 1919.
4 SHEETS—SHEET 3.
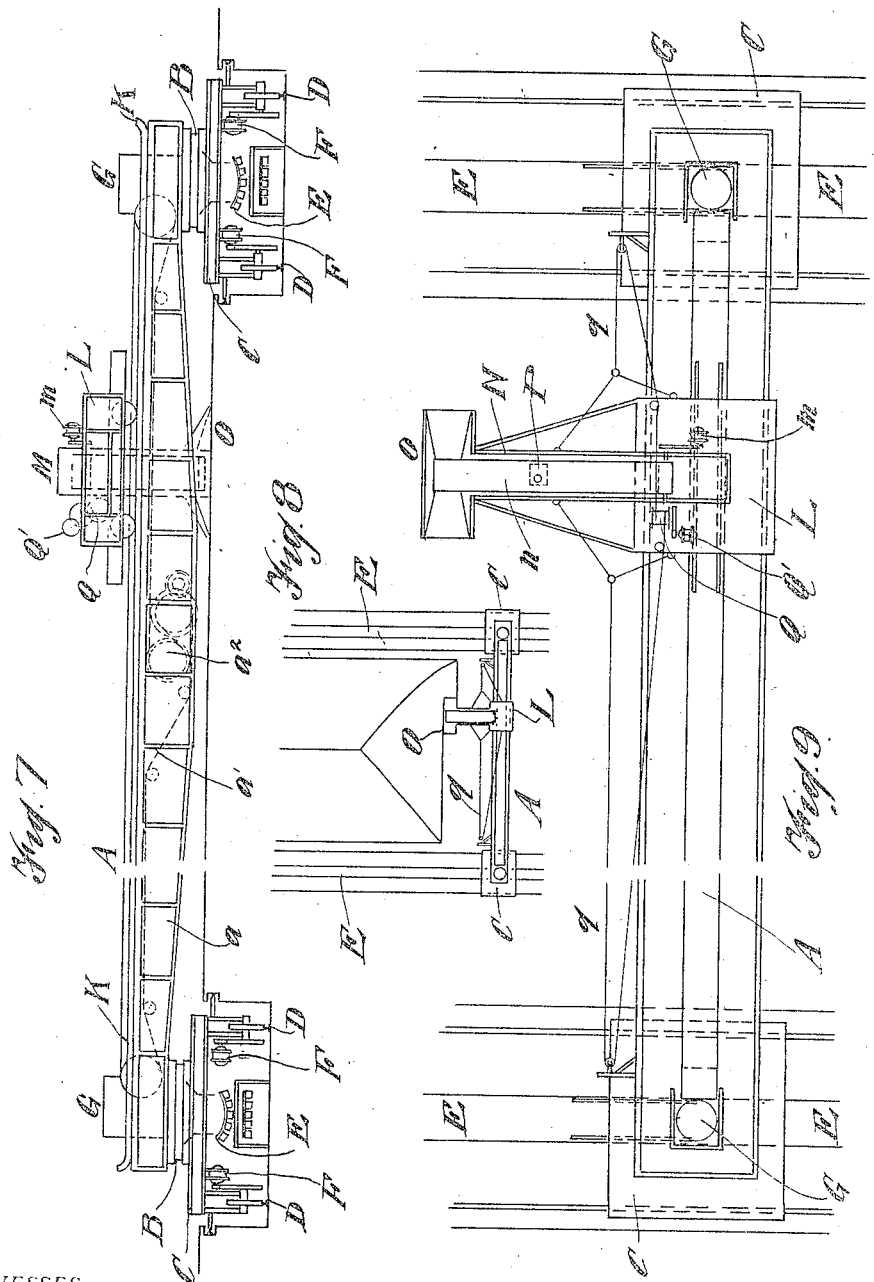
WITNESSES:
O. S. Richardson
S. F. Garvin
INVENTOR
Francis Lee Stuart.
BY HIS ATTORNEYS

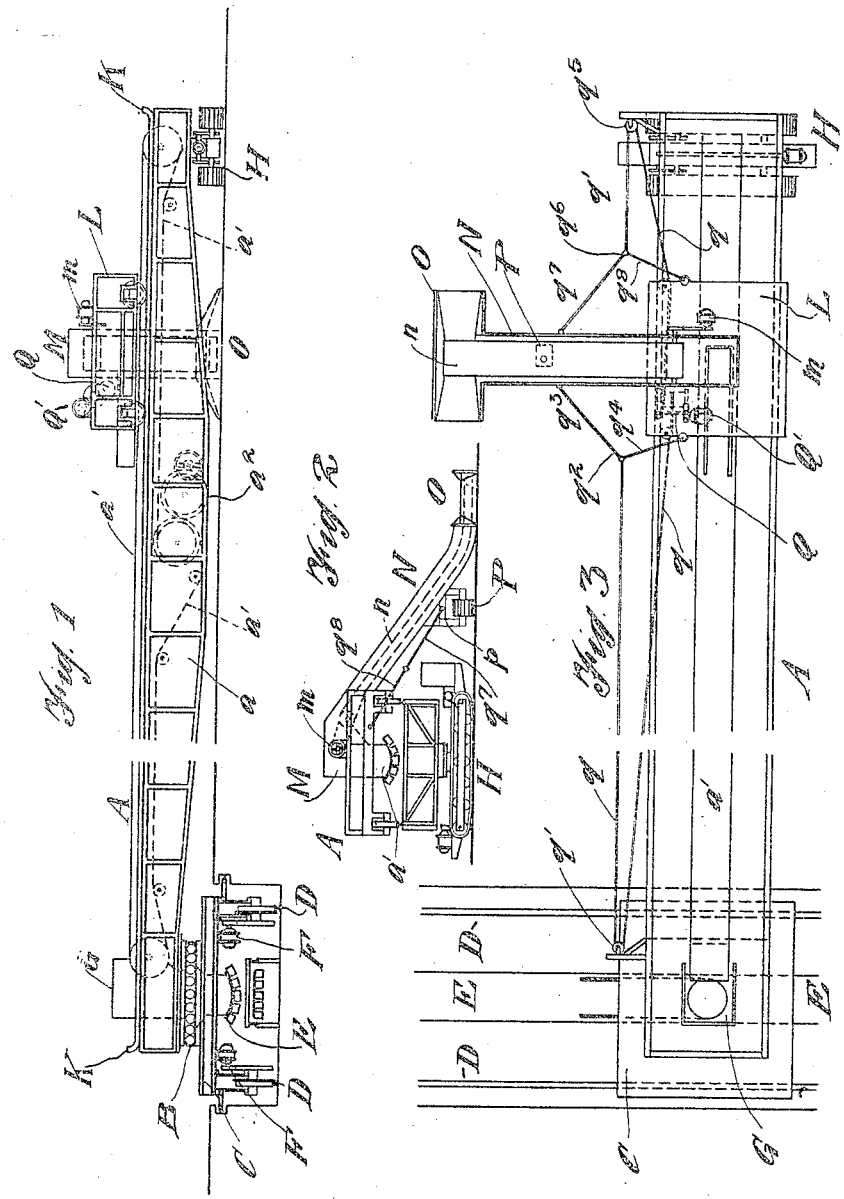

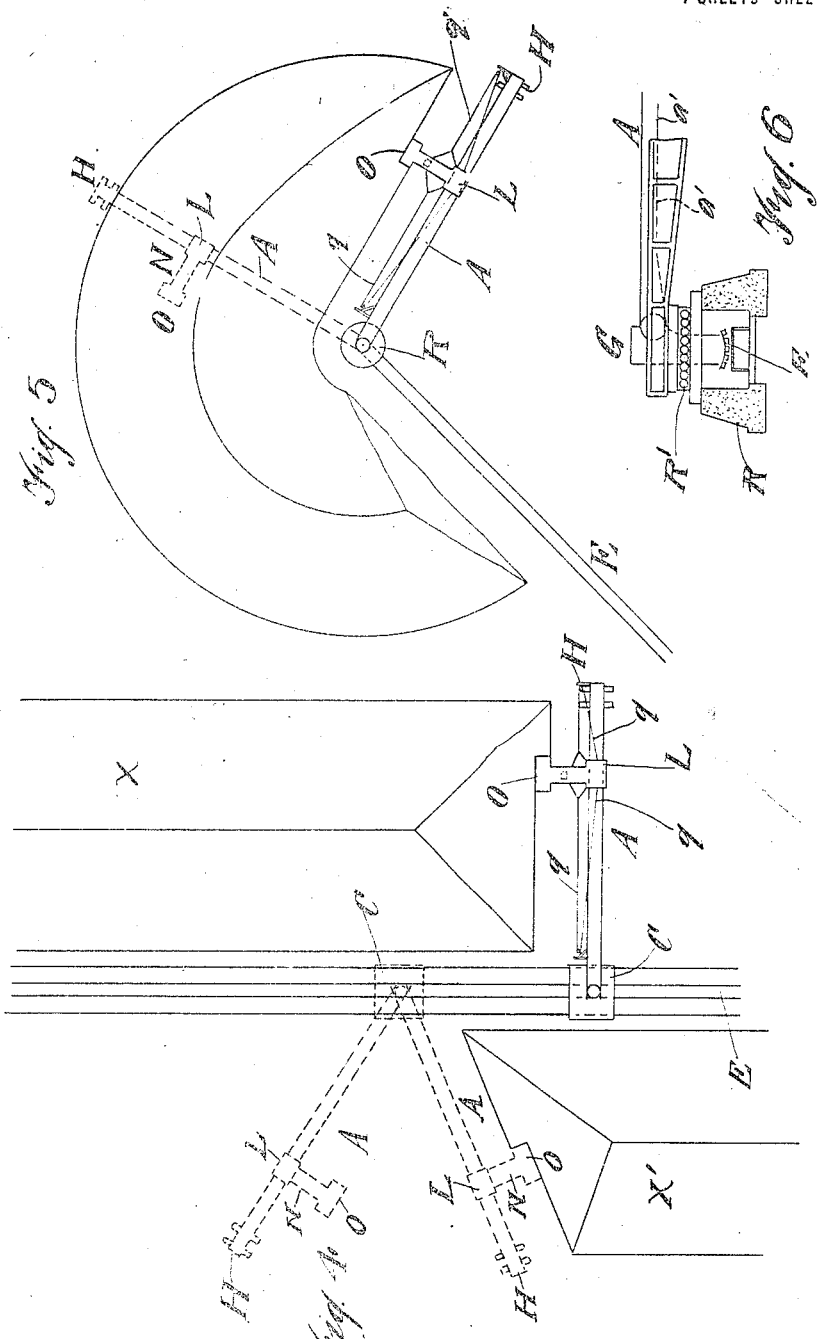

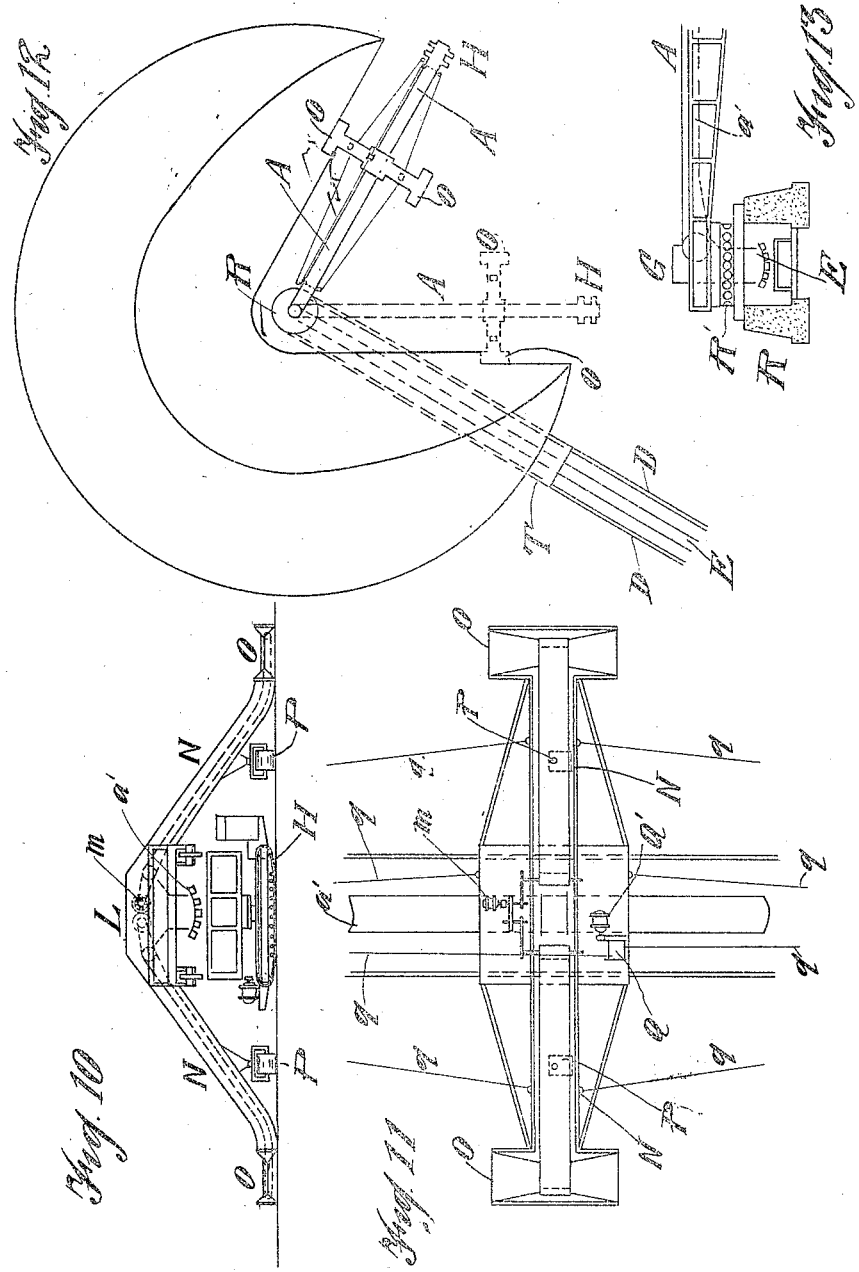

UNITED STATES PATENT OFFICE.

FRANCIS LEE STUART, OF WASHINGTON, DISTRICT OF COLUMBIA, ASSIGNOR TO INTERNATIONAL CONVEYOR CORPORATION, OF NEW YORK, N. Y., A CORPORATION OF NEW YORK.

RECLAIMING AND CONVEYING APPARATUS.

1,313,352.  Specification of Letters Patent.  Patented Aug. 19, 1919.

Application filed December 18, 1918. Serial No. 267,239.

*To all whom it may concern:*

Be it known that I, FRANCIS LEE STUART, a citizen of the United States, residing at Washington, in the District of Columbia, have invented certain new and useful Improvements in Reclaiming and Conveying Apparatus, of which the following is a specification.

This invention relates to apparatus for gathering material, such as coal, from piles or places of storage or supply and transferring it to other places, in which a plow, scraper, digger, or the like, gathers the material and transfers it to a conveyer, in turn delivering the material to a main conveyer belt which conveys the gathered material to its destination.

In my U. S. Patent No. 1,271,493 of July 2, 1918, I have shown apparatus of this general kind. This patent shows an apparatus in which a boom conveyer is rotatably mounted at its inner end on a truck, movable over a main conveyer belt, the outer end of the boom conveyer being supported by a tractor, by means of which it may be swung about its pivotal connection with the truck. On the frame of the boom conveyer is mounted a truck carrying a digger, which gathers material and delivers it to the boom conveyer, which in turn discharges the material through a hopper onto the main conveyer belt which carries the material to its destination. The truck which carries the digger is provided with a motor which drives the wheels of the truck so that the digger may be moved to any desired extent longitudinally of the boom conveyer. I have found that in some cases sufficient power cannot be obtained to move the digger or gathering means in the manner above specified, and according to my present invention I provide other means for accomplishing this result, briefly stated, consisting of a winch or windlass associated with cables, or the like, connected in a novel manner with the gathering devices, and which may be so operated as to move the gathering means to any desired extent longitudinally of the boom conveyer.

My improvements are illustrated in the accompanying drawings and will be hereinafter more particularly described.

Figure 1 is a view in side elevation of apparatus embodying some of my improvements.

Fig. 2 is an end view thereof.

Fig. 3 is a plan view of the same.

Fig. 4 is a diagram illustrating how the apparatus may be operated to gather material on opposite sides of a main conveyer belt.

Fig. 5 is a diagram illustrating how the same apparatus may be employed to gather material from a circular or annular pile.

Fig. 6 is a detail view showing how the inner end of the boom conveyer may be supported when the apparatus is employed to gather material from a circular pile.

Fig. 7 is a side view of a modified form of apparatus wherein the conveyer which delivers material received from the gathering means may be operated to discharge onto either of two main conveyer belts.

Fig. 8 shows diagrammatically and in plan the apparatus illustrated in Fig. 7 and indicates how it may be employed to gather material from a pile located between two main conveyer belts.

Fig. 9 is a plan view of the apparatus shown in Fig. 7.

Fig. 10 is an end view of an apparatus embodying my improvements, in which gathering means is employed on opposite sides of the boom conveyer or the conveyer which delivers to the main conveyer belt or belts.

Fig. 11 is a plan view of the apparatus shown in Fig. 10.

Fig. 12 is a diagram illustrating how the apparatus shown in Figs. 10 and 11 may be employed to gather material from a circular or annular pile.

Fig. 13 is a detail view showing how the boom conveyer may be supported pivotally at its inner end.

The boom conveyer or reclaiming conveyer A as shown is similar in general construction to that shown in my patent of July 2, 1918 above referred to. It comprises, generally, a frame $a$ and a conveyer belt $a'$ operated by motor mechanism $a^2$ mounted on the frame of the conveyer. At its inner end the boom conveyer is supported by a turntable B mounted on a truck C, the wheels of which traverse rails D which are parallel with the main conveyer belt E. The wheels of the truck are operated by motor mechanism F carried by the truck, and by this mechanism the truck carrying the boom conveyer may be moved to any desired position over the main conveyer belt. Material is delivered through the hopper G to the main conveyer belt, and the construction is such that the boom conveyer may be turned to any desired extent about its vertical axis while at all times delivering through the hopper to the main conveyer belt. It may also be swung from one side of the truck to the other so as to operate on either side of the main conveyer. At its outer end the boom conveyer A is supported by a tractor H preferably of the caterpillar type. This tractor may be made to coöperate with the motor mechanism F on the truck C to move the boom conveyer longitudinally relatively to the main conveyer, and it may also be used to swing or turn the boom conveyer about its pivotal connection with the truck. On the top of the frame of the boom conveyer there are rails K on which is mounted a truck L provided with a hopper M delivering to the conveyer belt $a'$, and the truck L supports the frame or housing N of a conveyer belt $n$, which delivers to the hopper M and receives material from gathering devices O. The belt $n$ is operated by a motor $m$ on the truck L and the frame or housing N is supported by a wheel or roller P mounted in a frame $p$ depending from the under side of the frame N. The gathering device O is preferably in the form of a scraper plow of the kind shown in my U. S. Patent No. 1,271,627 of July 9, 1918. This scraper plow is preferably made double-ended so as to gather material when moving in either direction longitudinally of the boom conveyer.

In order to move the gathering mechanism back and forth longitudinally on the boom conveyer or what may be called the intermediate conveyer, I employ a winch or windlass Q preferably mounted on the truck L and connected by cables or their equivalents to the gathering mechanism. Preferably the cables are arranged in the manner best illustrated in Fig. 3. As there shown, a cable $q$ extends from the winch or windlass Q to a pulley $q'$ on the inner end of the boom and from this pulley the cable extends to a point $q^2$ near one side of the gathering mechanism where it is connected with branches $q^3$, $q^4$ the branch $q^4$ being secured to the truck L and the branch $q^3$ being secured to the frame or housing of the belt $n$. The cable $q$ on the other side of the windlass passes around a pulley $q^5$ attached to the outer end of the frame of the boom conveyer and then the cable $q$ is attached at $q^6$ to branches $q^7$, $q^8$, the latter branch being attached to the truck L and the former branch being attached to the frame $p'$. The winch Q is operated by a suitable motor Q'.

In this way the gathering mechanism may with all necessary power be moved back and forth over the intermediate conveyer $a'$ and may deliver gathered material thereto while the intermediate conveyer is continuously running.

The reclaiming apparatus may be made to operate on either side of the main conveyer belt in the manner illustrated for instance, in Fig. 4, where X, X′ indicate piles of stored material on opposite sides of the main conveyer belt. As illustrated on the right hand side of Fig. 4, the boom conveyer is arranged at right angles to the main conveyer belt and the gathering mechanism when operated moves in straight lines perpendicular to the longitudinal axis of the main conveyer belt. Fig. 4 illustrates how the gathering means has gathered material from the end of the pile. It is, of course, understood that after the gathering means has been moved to its full extent in one direction the boom conveyer is advanced longitudinally of the main conveyer belt to move the gathering means into proper position to remove an additional slice of material from the pile.

The left hand side of Fig. 4 illustrates how the boom conveyer may be set at different angles to gather material from piles of different shapes, but in this form of the apparatus the gathering means is always arranged at approximately right angles to the longitudinal axis of the boom conveyer, whatever may be the position of the boom conveyer relatively to the main conveyer.

In Fig. 5 I have illustrated the manner in which the apparatus may be employed to gather material from a circular or annular pile such as might be formed by a derrick arm operating from a pivotal center.

In Fig. 5 E indicates the main conveyer, but in this case the boom conveyer instead of being supported by a truck is mounted at its inner end on a stationary support, with which it has a pivotal connection, which is best illustrated in Fig. 6 where R indicates a foundation into which the main conveyer belt E extends. On this foundation is mounted a turntable R′ to which the inner end of the boom conveyer A is connected. The boom conveyer may be swung to any desired extent about the axis of the turntable and delivers through a hopper G to the main conveyer belt.

Fig. 5 shows diagrammatically how the apparatus may be operated to gather material from a circular pile. Full lines indicate how the gathering means is operated at one time to gather the material, while dotted lines indicate another position of the mechanism. It will be observed that in this case the boom conveyer is moved to assume different angular positions relatively to the main conveyer belt and the gathering mechanism always operates in radial lines relatively to the axis of the turntable.

In some cases it is desirable to deliver material to two or to one of two parallel main conveyer belts, and when this is the case the apparatus is preferably modified in the manner indicated in Figs. 7, 8, and 9. Much of the mechanism is substantially the same as that above described, and the mechanism when similar is designated by similar reference characters. In this form of the apparatus the tractor H is omitted, and each end of the frame of the intermediate conveyer is supported by a truck C constructed and equipped in the manner before described. This is practically the only difference between the two forms of the apparatus and further description of the construction seems unnecessary. In this apparatus material may be gathered in the manner indicated in Fig. 8 from a pile between two main conveyers and the conveyer belt $a'$ may be moved in either direction to deliver to either of the main conveyers, or it may be reversed at various times to supply both of said conveyers.

Fig. 10 illustrates a construction in which gathering mechanism is employed on opposite sides of the intermediate or boom conveyer. I have shown this modification applied to a boom conveyer supported at its outer end by a tractor in the manner illustrated in Fig. 1 and hereinbefore described. The gathering mechanism on opposite sides of the boom conveyer are of the same construction and when the construction is similar to that shown in Figs. 1, 2 and 3 of the drawings the parts are similarly lettered. The cables $q$ are operated by a single winch Q and the belts $n$ are operated by a single motor $m$. Inasmuch as this mechanism is similar in all respects to that before described the connections and arrangements of the cables need not be further explained.

In the mechanism shown in Figs. 1 to 9 of the drawings, no provision is made for transferring the gathering means from one side of the intermediate or boom conveyer to the other, and this could not well be done in view of the arrangement of cables shown, but there are times when it is desirable to gather material on opposite sides of the intermediate conveyer, and I make provision for such contingency by providing the intermediate or boom conveyer with gathering means on each side, as shown in Fig. 10. The desirability of mechanism of this kind will be apparent by reference to Fig. 12, which illustrates diagrammatically and in a manner somewhat similar to that shown in Fig. 5 how material may be gathered from a circular or annular pile. The inner end of the boom conveyer is supported in precisely the same way as that shown in Figs. 5 and 6. It will be observed that at one time the gathering means on one side of the boom conveyer may be operated to gather material from the foot of the pile, and then the boom conveyer may be swung over the belt E to bring the gathering means on the opposite side of the boom into operation as indicated by dotted lines in Fig. 12. The same apparatus shown in Figs. 10 and 11 may be used to gather material in the manner indicated in Figs. 4 and 5, but the apparatus shown in Figs. 10 and 11 has the advantages above specified.

Other forms of gatherers of material may be substituted for those shown, and when I refer to cables it will be understood that I includes ropes, chains, and the like. It will also be understood that where I refer to conveyer belts, other equivalent conveying means is considered within the scope of such definition.

By my improvements much of the strain on the mechanism which was heretofore incident to the reciprocation of the material gatherer over the boom conveyer is relieved or avoided inasmuch as the means for moving the gatherer are connected to it at a considerable distance from its inner end, and in the preferred arrangement the operating cables are connected to the truck, which supports the inner end of the gatherer, and to the frame or housing of the gatherer about midway between its opposite ends.

In Fig. 12 T indicates a housing for protecting the main conveyer belt the pile of material is being formed.

I claim as my invention:

1. Apparatus for gathering, transferring, and conveying material, comprising a main conveyer belt, a truck movable longitudinally over said belt, a boom conveyer supported at one end by said truck and mounted to swing about a vertical axis passing through said truck, a tractor for supporting the outer end of said boom conveyer and for swinging it about said vertical axis, a truck movable longitudinally over said boom conveyer, a gatherer of material supported by said last mentioned truck and movable longitudinally therewith and which comprises a frame or housing, a plow and a conveyer belt; a winch carried by said last mentioned truck, and a cable extending from said winch to the first mentioned truck, and thence to the gatherer carrying truck and also to the frame of the gatherer whereby the gatherer and its supporting truck may be moved longitudinally over the boom conveyer whatever be the angular position of the boom conveyer relatively to the main conveyer.

2. Apparatus for gathering, transferring and conveying material, comprising a main conveyer belt, a truck movable longitudinally over said belt, a gatherer of material to be conveyed, an intermediate conveyer between the gatherer and the main conveyer belt, a truck to which the inner end of the gatherer is connected, a winch carried by said last mentioned truck, and a cable operated by the winch and connected to the gatherer-carrying truck and to the gatherer intermediate its inner and outer ends, for moving said gatherer back and forth over the intermediate conveyer.

3. Apparatus for gathering, transferring and conveying material, comprising a main conveyer belt, a boom conveyer delivering thereto, a gatherer of material to be conveyed, a truck to which the gatherer is connected at its inner end, a winch on said truck, and a cable extending from the winch to the opposite ends of the boom conveyer and which is connected also to the gatherer-carrying truck and to the gatherer between its inner and outer ends.

4. Apparatus for gathering, transferring and conveying material, comprising a main conveyer belt, a truck movable longitudinally over said belt, a gatherer of material to be conveyed, an intermediate conveyer between the gatherer and the main conveyer belt, a truck to which the inner end of the gatherer is connected and which is movable longitudinally over the intermediate conveyer, a winch on the truck, and a cable extending from the winch to the opposite ends of the boom conveyer and which is connected also to the gatherer-carrying truck and to the gatherer intermediate its inner and outer ends.

5. Apparatus for gathering, transferring and conveying material comprising a main conveyer belt, a truck movable longitudinally over said belt, a gatherer of material to be conveyed comprising a frame or housing, a plow, and a conveyer belt, means for wheel supporting the gatherer between its inner and outer ends, an intermediate conveyer between the gatherer and the main conveyer belt, a truck to which the inner end of the gatherer is connected and which is movable longitudinally over the intermediate conveyer, a winch carried by the truck, and a cable operated by the winch and connected to the gatherer-carrying truck and to the gatherer in close proximity to its wheeled support.

6. Apparatus for gathering, transferring and conveying material, comprising a main conveyer belt, a boom conveyer pivoted at one end to move about a vertical axis and delivering to the main conveyer, a gatherer of material to be conveyed on each side of the boom conveyer and which deliver thereto, a winch, and cables connecting the winch with said gatherers to move them longitudinally over the boom conveyer.

In testimony whereof I have hereunto subscribed my name.

FRANCIS LEE STUART.